(12) United States Patent
Hammond et al.

(10) Patent No.: US 11,383,220 B1
(45) Date of Patent: Jul. 12, 2022

(54) METHOD AND MATERIAL FOR SYNTHESIS AND PURIFICATION BY USE OF A COATED SOLID SUBSTRATE

(71) Applicant: Faster Chemistry LLC, Brooklyn, NY (US)

(72) Inventors: Gerald B Hammond, Shelbyville, KY (US); Bo Xu, Louisville, KY (US)

(73) Assignee: Faster Chemistry LLC, Larchmont, NY (US)

( * ) Notice: Subject to any disclaimer, the term of this patent is extended or adjusted under 35 U.S.C. 154(b) by 494 days.

(21) Appl. No.: 16/283,462

(22) Filed: Feb. 22, 2019

Related U.S. Application Data (63) Continuation of application No. PCT/US2018/020045, filed on Feb. 27, 2018.

(60) Provisional application No. 62/710,683, filed on Feb. 26, 2018.

(51) Int. Cl.
| | |
|---|---|
| *B01J 20/26* | (2006.01) |
| *B01J 20/28* | (2006.01) |
| *B01J 20/32* | (2006.01) |
| *B01J 20/283* | (2006.01) |

(52) U.S. Cl.
CPC ............ *B01J 20/26* (2013.01); *B01J 20/283* (2013.01); *B01J 20/28085* (2013.01); *B01J 20/3204* (2013.01); *B01J 20/3208* (2013.01); *B01J 20/3272* (2013.01)

(58) Field of Classification Search
CPC .. B01J 20/26; B01J 20/280085; B01J 20/283; B01J 20/3204; B01J 20/3208; B01J 20/3272
USPC ......................................................... 502/402
See application file for complete search history.

(56) References Cited

U.S. PATENT DOCUMENTS

2017/0291829 A1* 10/2017 Lai ........................... C02F 1/285
2018/0290125 A1* 10/2018 Beall .................. B01D 17/0202
2020/0094217 A1* 3/2020 Mundheim .............. C09K 3/32

* cited by examiner

*Primary Examiner* — Edward M Johnson
(74) *Attorney, Agent, or Firm* — John Gladstone Mills, III; Patent Counsel Group LLP (57) ABSTRACT

The method and materials of this invention make possible substantially faster techniques for organic-aqueous extractions and routine chemical reactions work-ups. The inventive material uses silicone elastomer-coated glass powders, magnetic powders, and sponges as absorbents to extract organic products from an aqueous mixture. After separation from the mixture, these different forms now loaded with organic products can serve as a convenient input for flash chromatographic separations or other processing. With these techniques, tedious liquid-liquid extractions are replaced by a simple solid filtration or transfer and emulsion formation is eliminated. These versatile sorbents can also be used for larger scale work-ups, various extractions of organics from an aqueous solution (e.g., water purification) or gas phase and various analytical or other applications.

18 Claims, 12 Drawing Sheets

NOTES: FOR ILLUSTRATION PURPOSES ONLY. DRAWING IS NOT TO SCALE.

Fig. 1

NOTES: FOR ILLUSTRATION PURPOSES, POLYMER COATING THICKNESS IS EXAGGERATED. DRAWING IS NOT TO SCALE.

Note: Polymer coating thickness is exaggerated for illustration purposes.

| NUMBER | POWDER SIZE (MESH) | SILICONE COATING (WEIGHT / WEIGHT %) | DIFFICULTY OF TRANSFER | RECOVERY FROM WATER (%) | RECOVERY FROM BRINE (%) |
| --- | --- | --- | --- | --- | --- |
| 1 | 100 | 0 | EASY | <50 | <50 |
| 2 | 100 | 1 | MODERATE | <50 | <50 |
| 3 | 100 | 3 | EASY | 75 | 91 |
| 4 | 100 | 4 | EASY | 74 | 92 |
| 5 | 100 | 5 | EASY | 78 | 91 |
| 6 | 180 | 1 | MODERATE | 83 | 92 |
| 7 | 180 | 3 | EASY | 87 | 95 |
| 8 | 180 | 5 | EASY | 88 | 97 |
| 9 | 400 | 5 | HIGH | -- | -- |

FIG. 6

| COMPOUNDS | RECOVERY RATE FROM WATER (%) | RECOVERY RATE FROM BRINE (%) |
|---|---|---|
| *p*-Toluenesulfonamide | 88 | 96 |
| Ferrocene | 95 | 97 |
| *p*-Toluenesulfonyl hydrazide | 63 | 92 |
| Indole | 98 | 97 |
| 2-Methyl indole | >99 | >99 |
| 2-Hydroxynaphthalene | >99 | >99 |
| 1-Naphthylboronic acid | 95 | >98 |
| Benzyl phenylacetate | >99 | >99 |
| Glucose | 0 | 0 |
| L-phenylalanine | 0 | 0 |

METHOD AND MATERIAL FOR SYNTHESIS AND PURIFICATION BY USE OF A COATED SOLID SUBSTRATE

PRIORITY BENEFIT INFORMATION

This application is a continuation application ("by-pass application") of prior application PCT/US2018/020045, filing date Feb. 27, 2018 and claims the benefit of provisional U.S. application 61/710,683, filing date Feb. 26, 2018.

BACKGROUND OF THE INVENTION AND PRIOR ART

Organic synthesis is of fundamental importance in the discovery of new pharmaceuticals, agrochemicals, and advanced materials. For example, during the discovery phase to develop a pharmaceutical, the synthesis of a large number of compounds is needed for biological evaluation and optimization. However, the labor-intensive nature of organic synthesis and its hazardous conditions have not changed fundamentally despite other significant advances. Typically, after reaction completion, a work-up or clean-up procedure is needed to quench the active intermediate (e.g. acid chloride) and catalyst(s) and remove water-soluble inorganic byproducts (e.g. salts) and polar solvents, which can detrimentally affect chromatographic separation or subsequent processing. The ultimate goal of work-up is to separate the organic and aqueous components present after reaction completion. Thus, reaction work-up is a particularly time- and labor-consuming practice. (Cork, D.; Hird, N. *Drug Discov. Today* 2002, 7, 56-63.)

The most common prior reaction work-up procedure has at its heart liquid-liquid extraction (LLE) using a separatory funnel. The practice of LLE dates back to the late 19th century. It is based on the partition of an organic compound between two liquid phases (usually an organic and aqueous phase). Generally, the organic compound will preferentially dissolve in one phase versus the other, enabling separation and purification. A typical LLE-based work-up procedure has the following steps:

1) The crude reaction mixture is quenched with a suitable aqueous solution (e.g. saturated $NH_4Cl$ solution) to stop the reaction and destroy excess reagent(s)/intermediate(s)/catalyst(s) and to dissolve water-soluble by-products. The quenching process typically leaves a complex mixture of compounds that are partially soluble in both the organic and aqueous phases of the quenched reaction mixture.

2) LLE is performed to separate the organic compounds from the aqueous phase solution consisting of water and water-soluble compounds. The organic compounds are extracted from the quenched reaction mixture with suitable (chemistry-dependent) organic solvents (e.g., diethyl ether or ethyl acetate) in an iterative fashion. The combined organic layers with extracted organics are then washed with an aqueous solution to remove any residual inorganic by-products.

3) The organic phase is dried using a solid drying agent such as $Na_2SO_4$. Drying may take 10 minutes to several hours depending on the drying agent and solvent used. The drying agent is then removed by filtration and the solvents in the filtrate are evaporated under vacuum, leaving the organic reaction products behind as a residue.

4) The organic residue is further purified by flash chromatography or other processes.

All of these steps are labor- and time-consuming, especially for the work-up of a large number of reactions. Additional disadvantages of LLE include the use of relatively large volumes of solvent, possible emulsion formation that blurs the separation between liquid phases, and a relatively high chance of contact with potentially hazardous chemicals and solvents. (Cork, D.; Hird, N. *Combinatorial chemistry* 2002, 7, 56.)

To overcome these drawbacks, the inventors developed a substantially faster technique for work-up that relied on a porous organic polymer ('Porelite') supported solvent phase (a 'rigid solvent') to extract organic products from an aqueous reaction mixture. Porelite was based on a then-new type of porous polymer—a High Internal Phase Emulsion polymer ('polyHIPE') containing extremely large and interconnected pores. This improvement was disclosed in U.S. Pat. No. 9,272,260 to Gerald B. Hammond and Bo Xu. In U.S. Pat. No. 9,272,260, the porous organic solid support functioned like a honeycomb with an array of interior spaces to support or hold in place very small droplets of an organic extraction solvent through the 'attraction' (polarity-based) of the honeycomb (organic polymer) for the solvent or desired organic products. In this new invention, the molecules of the organic compounds (solvent or desired products) permeate into a solid polymer (as either a solid or coating on a support) into which the aqueous phase cannot permeate. Additionally with respect to U.S. Pat. No. 9,272,260, large scale preparation of a polyHIPE-type polymer such as Porelite is difficult. A large amount of a templating surfactant was used in the preparation of Porelite and the complete removal of the surfactant is also difficult. Also, the density of polystyrene foam-like Porelite is very low (ca. 0.15 gram/mL), which causes handling and weighing problems, particularly in low ambient humidity conditions that promote static electric charge generation. This new invention is an improvement in that the materials are more dense and are free-flowing powders or easy-to-handle sponges, foams or pieces of porous polymer solids. They are prepared by a simple coating operation or commercially available as foams or sponges made for other applications.

Typically, after reaction completion, a work-up or clean-up procedure is needed to quench the active intermediate (e.g. acid chloride) and catalyst(s) and remove water-soluble inorganic byproducts (e.g. salts) and polar solvents, which can affect chromatographic separation. Reaction work-up is a particularly time- and labor-consuming practice.

Therefore, it is highly desired to develop a faster reaction work-up protocol using an easy-to-handle absorbent which can be prepared using a scalable protocol.

SUMMARY OF INVENTION

The present invention discloses materials and methods for substantially reducing the time required for extracting organic compounds dissolved in an aqueous phase or aqueous solution, typically the major part of reaction work-up. The inventive material uses silicone elastomer-coated glass powders, magnetic powders and sponges, foams or other porous supports as absorbents to extract organic compounds from an aqueous mixture. After separation from the mixture, these different forms now loaded with organic compounds can serve as a convenient input for flash chromatographic separations or other processing steps. With these techniques, tedious liquid-liquid extractions are replaced by a simple solid filtration or transfer and emulsion formation is eliminated. These versatile sorbents can also be used for larger scale work-ups, various extractions of organics from an aqueous phase (e.g., water purification) or gas phase and various analytical or other applications. They are also easy to handle, overcoming the handling problems with the previously-developed Porelite.

BRIEF DESCRIPTION OF THE DRAWINGS

FIG. 8 (a) and (b) are chromatographic traces for the separation of a test mixture.

FIG. 9 (a)-(p) are disclosed reactions comparing conventional Liquid-Liquid Extraction (LLE)-based reaction work-ups with this invention's FastWoRX-based reaction work-ups.

DETAILED DESCRIPTION OF THE INVENTION

The present invention discloses methods and materials to speed-up and improve the time-, labor-, and solvent-consuming practices in chemical synthesis, namely the separation of organic compounds from an aqueous phase generally now done using liquid-liquid extraction (LLE). The disclosed technology differs from traditional liquid-liquid extraction in that a 'solid solvent' (silicone elastomer-coated glass powders, magnetic powders and sponges or foams) is used to extract the desired product from the aqueous mixture rather than a traditional 'liquid solvent' (e.g. diethyl ether). The disclosed technology thereby avoids the use of large quantities of potentially health- and environment-damaging solvents and prevents the formation of troublesome emulsions. Reaction work-up, generally comprising quenching, liquid-liquid extraction, and isolation steps, is usually the most labor- and time-consuming activity in a chemical synthesis, particularly the LLE step. The present invention, therefore, greatly benefits those practicing chemical synthesis.

The disclosed invention develops a fast and environmentally-friendly organic-aqueous phase separation protocol using easy-to-handle absorbents which can be prepared using easily scalable protocols.

Figure 1:
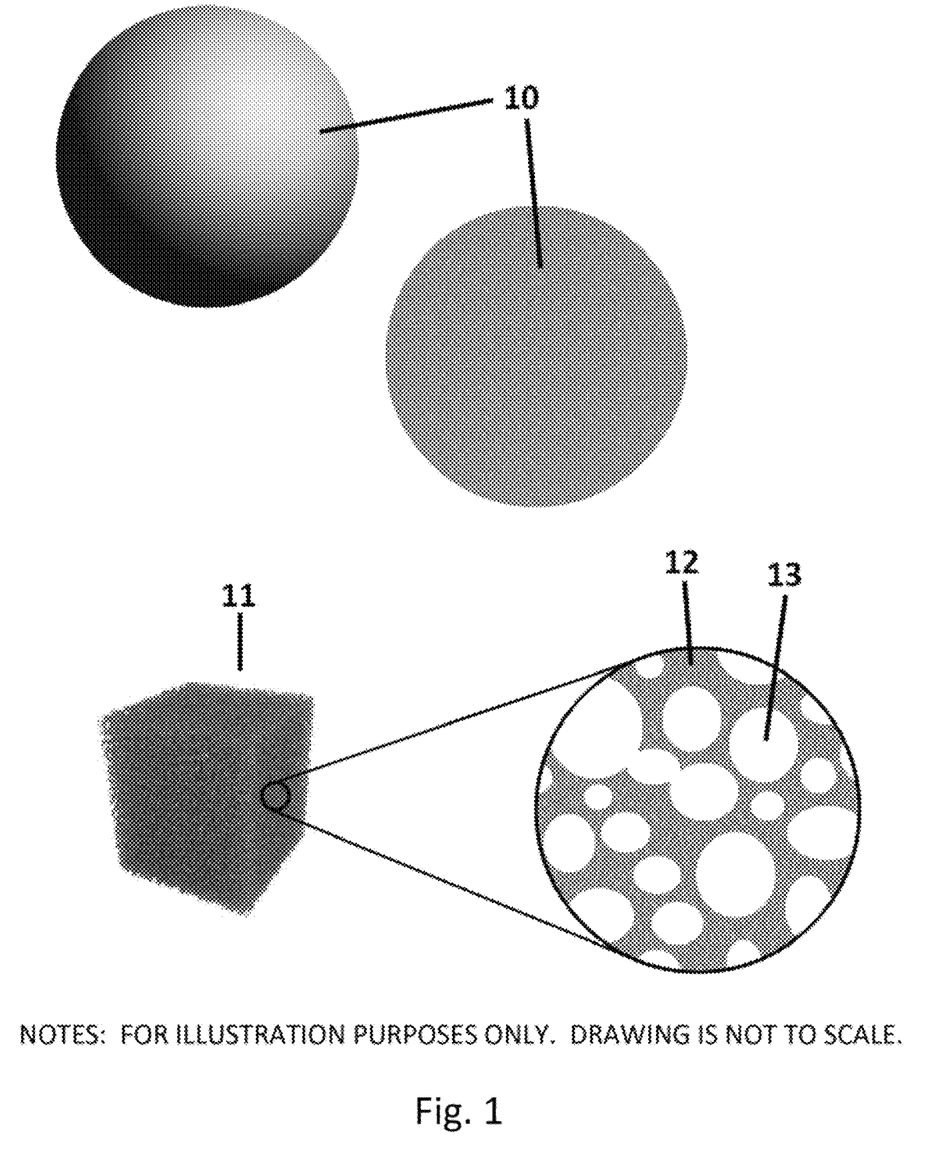
FIG. 1 is a schematic drawing of a material.

Instead of using a porous organic polymer, a preferred embodiment of this next-generation extraction absorbent is based on forms of a permeable organic elastomer (FIG. 1) such as solid beads (10) or foam or porous solid (11). In the foam or porous solid, small connected voids (13) in the elastomer (12) allow the mixture to contact a large surface area of absorbent for good mass transfer.

Figure 2:
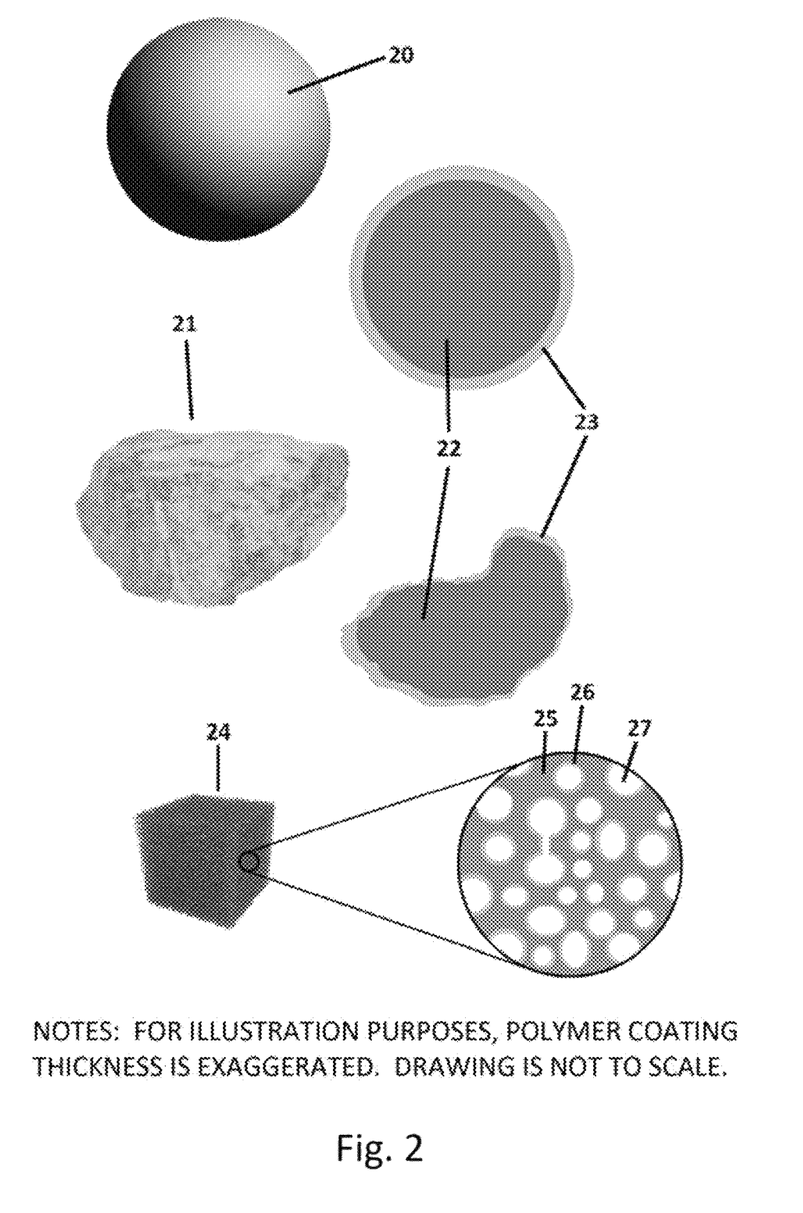
FIG. 2 is a schematic drawing of a coated substrate.

Another preferred embodiment (FIG. 2) of the invention is the use of coated forms best suited for a particular application (20, 21, 24). An inert inorganic support (or substrate or core) (22) or foam or porous solid (25) is coated with a permeable organic elastomer (23, 26). The support (22 or 25) is inert relative to the application chemistry. In the foam or porous solid, small connected voids (27) in the foam or porous solid (25) allow the mixture to contact a large surface area of absorbent for good mass transfer.

Figure 3:
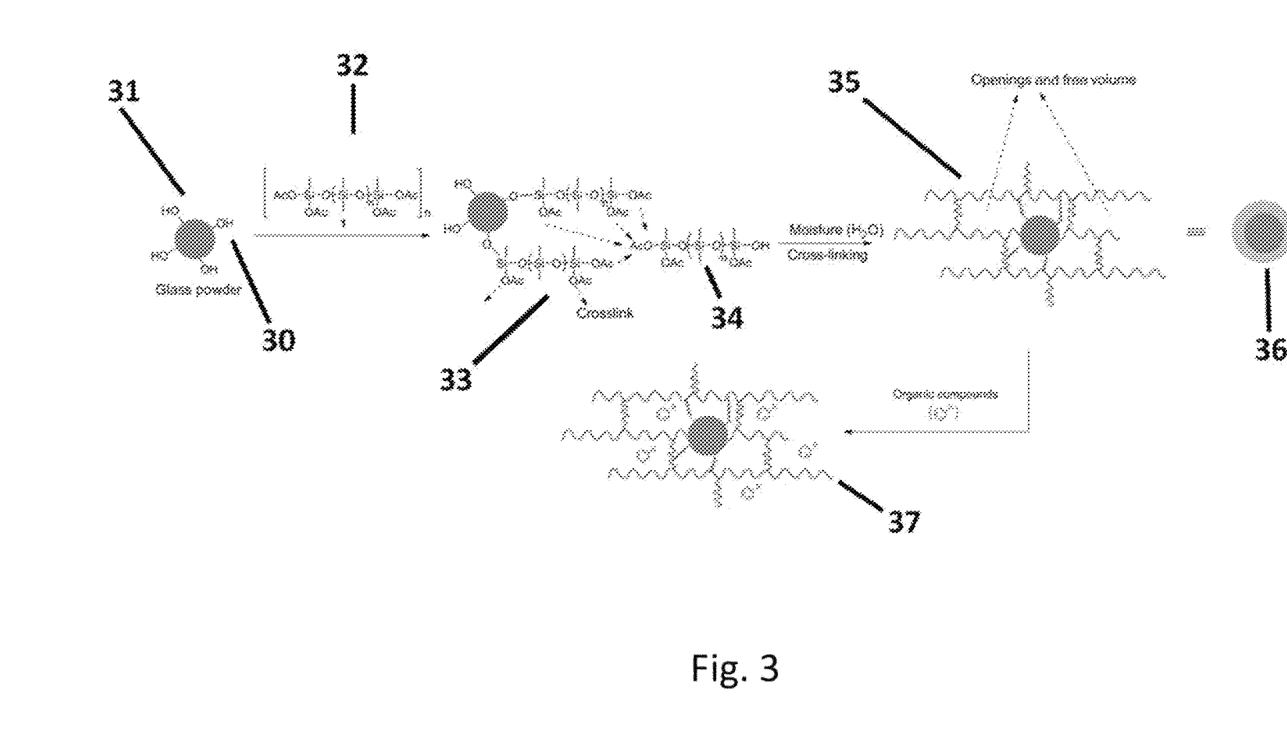
FIG. 3 is a schematic drawing of a silicone coated substance.

In another preferred embodiment (FIG. 3), the support will typically be an inorganic such as glass beads (30) or powder of suitable size (31) but could be an organic if suitable for the application. The inorganic support is glass powder, which is generally chemically inert and readily available at commercial scale. A commercially available and inexpensive silicone elastomer (silicone rubber) precursor (32) for coating the glass powder has the poly-dimethylsiloxane (PDMS) backbone (34) with reactive acetoxy sites for cross-linking (33). The precursor reacts with the surface hydroxy groups on the glass powder and cross-links by reacting with the moisture in the air (35), releasing the by-product acetic acid. As a result, the glass particles are coated with a thin layer of silicone elastomer (36). Other siloxane compounds, including fluorinated ones, could also be used depending on the application. Silicone elastomers are generally inert, highly permeable and hydrophobic. Their high permeability has been applied in membranes for blood oxygenation, gas separation, drug delivery, catalyst immobilizations, and solid-phase microextraction (SPME). The high flexibility of the silicon-oxygen chain in silicone elastomers provides "openings" and "free volume" (35) that permit the incorporation and diffusion of organic products and solvents (37). Compared to most organic polymers, silicone elastomers are more liquid-like.

Figure 4:
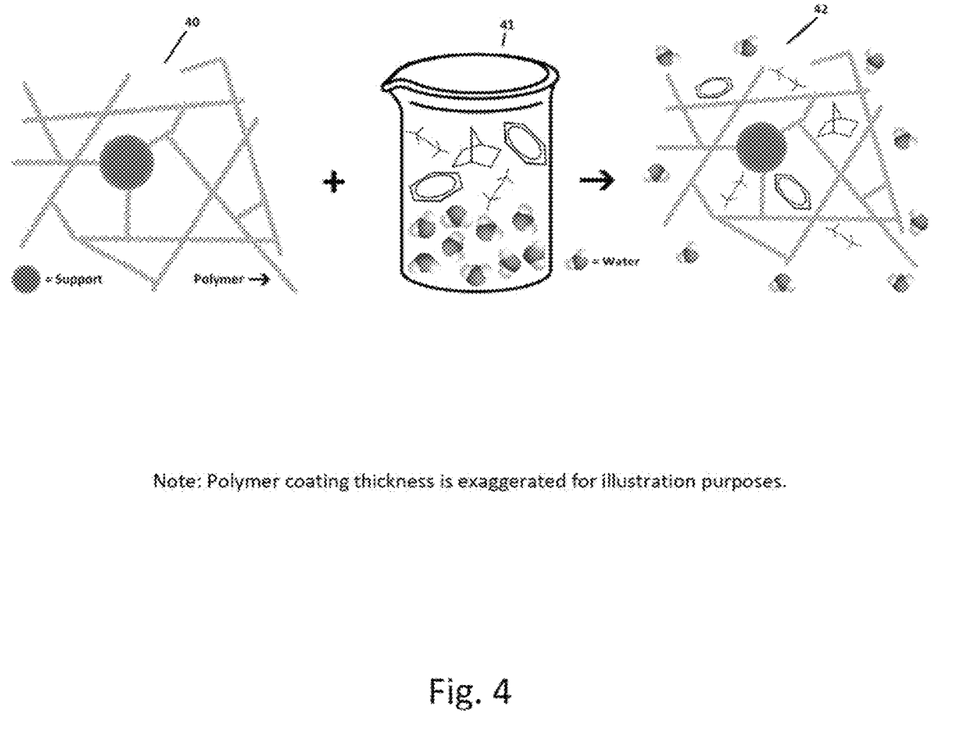
FIG. 4 is a schematic of a method of use of the invention.

As shown in FIG. 4, the silicone elastomer-coated glass powder sorbent (trademark name FastWoRX) (40) can be used for next-generation organic-aqueous phase separations. The organic compounds in an aqueous mixture (41) will have an affinity for the organic silicone polymer layer because of silicone's high permeability and high internal 'free volume,' while water is excluded because of silicone's hydrophobicity. As a result, the organics are incorporated in the sorbent (42) allowing them to be easily separated from the aqueous phase without LLE and its previously described problems.

Figure 5:
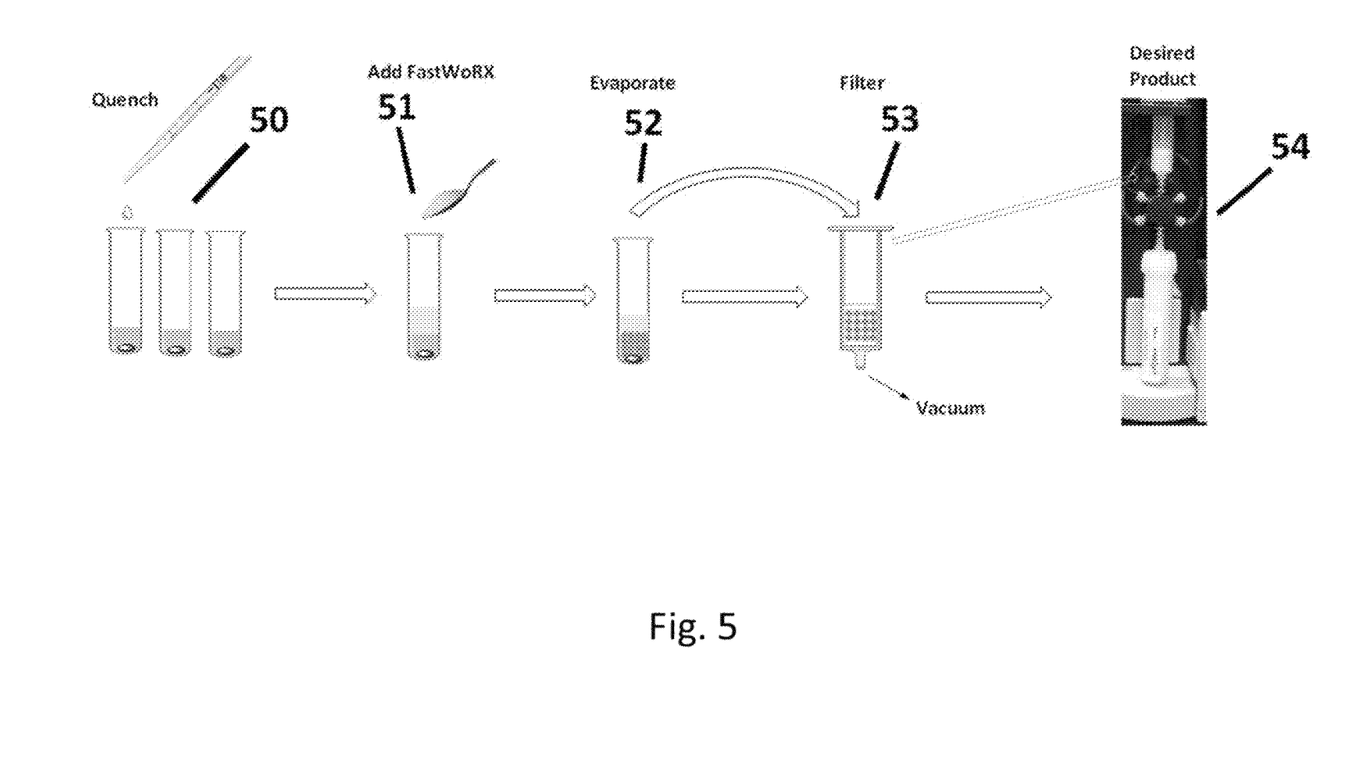
FIG. 5 is a schematic for a reaction workup using the invention FastWoRX.

The typical work-flow of a FastWoRX-based reaction workup is shown in FIG. 5. The reaction is conducted in the usual way and quenched with a suitable aqueous solution (50). Instead of using a relatively large amount of a conventional organic solvent such as ethyl acetate to extract the organics from the aqueous reaction mixture, FastWoRX powder is added to the mixture (51). Then, after evaporating most of the solvent (52) and a simple filtration of the FastWoRX powder from the aqueous mixture (53), the desired organic products are now incorporated in the Fast-WoRX powder. The desired products can be eluted from the FastWoRX powder by a suitable organic solvent during chromatography (54) or other processing. By doing this, tedious and time-consuming liquid-liquid extraction(s) is avoided. And, a common problem in LLE—emulsion formation—is eliminated because this is no need for the separation of two liquid phases. Also, automation and parallelization of FastWoRX-based work-ups is much easier than automating traditional LLE with its need to detect the interface between two liquid phases. Compared to traditional LLE-based work-up, FastWoRX-based work-up greatly reduces the time for reaction work-up and greatly reduces the chance of contact with potentially hazardous chemicals.

Example 1—Magnetic Oxide Powder Based

In the preferred embodiment of the invention, preparation of silicone-coated absorbent (FastWoRX-M) (Magnetic powder-based). 10 grams of silicone rubber precursor (32 in FIG. 3) was dissolved in 150 mL of ethyl acetate in a 500-mL round bottom flask while stirring, then 190 grams of $Fe_3O_4$ powder (circa 60 micrometer diameter) was added. The mixture was stirred for 10 minutes and then excess ethyl acetate was removed using a rotavap under vacuum. The obtained powder was placed on a tray and kept in open air for 48 hours to cure. (Caution should be exercised as the curing process generates acetic acid.) The obtained powder (circa 200 grams) was washed with ethyl acetate and dried in vacuum.

Example 2—Glass Powder Based

In another preferred embodiment of the invention, preparation of silicone-coated absorbent (FastWoRX-S) (Glass powder-based). 10 grams of silicone rubber precursor (32 in FIG. 3) was dissolved in 150 mL of ethyl acetate in a 500-mL round bottom flask while stirring, then 190 grams of glass powder (180 mesh) was added. The mixture was stirred for 10 minutes and then excess ethyl acetate was removed using a rotavap under vacuum. The obtained powder was placed on a tray and kept in open air for 48 hours to cure. (Caution should be exercised as the curing process generates acetic acid.) The obtained powder (circa 200 grams) was washed with ethyl acetate and dried in vacuum.

Example 3—Polymer Sponge Based

In another preferred embodiment of the invention, preparation of silicone-coated absorbent (FastWoRX-SP) (Sponge-based). 10 grams of silicone rubber precursor (32 in FIG. 3) was dissolved in 150 mL of ethyl acetate in a 500-mL round bottle flask while stirring, then 20 pieces of cylindrical polyurethane sponge (28.5 mm diameter, 20 mm height) were added. The mixture was stirred for 10 minutes and then excess ethyl acetate was removed using a rotavap under vacuum. The obtained sponges were placed on a tray and kept in open air for 48 h to cure. (Caution should be exercised as the curing process generates acetic acid.) The obtained sponges were washed with ethyl acetate and dried in vacuum.

General Procedure for FastWoRX Reaction Work-Ups

General procedure for FastWoRX-S-based reaction work-up (using the synthesis of 3 in FIG. 9 as an example). Under argon protection, a dry Schlenk tube was loaded with phenylboronic acid (2) (122 mg, 1 mmol), $Pd(OAc)_2$ (1.2 mg, 0.01 mmol, 1%), XPhos (4.8 mg, 0.02 mmol, 2%), and $K_3PO_4$ (212 mg, 1 mmol). Then, toluene (2 mL) and 4-bromoanisole (1) (93.5 mg, 0.5 mmol) were introduced. The resulting mixture was stirred at 80° C. for 12 hours. The reaction was quenched with saturated ammonium chloride solution (1 mL). Then, while stirring, EtOAc (5 mL) and FastWoRX-S powder (1.0 g) was added to the reaction mixture. Then, most of the solvents were removed under reduced pressure. Then, the reaction mixture was filtered through a CombiFlash loading cartridge and the reactor was rinsed with 5 mL of brine. The loading cartridge was flushed with vacuum for 5 minutes and then was connected to an automatic flash chromatography system directly for chromatographic separation (EtOAc:hexanes=1:50). Product 3 (91.3 mg, 99%) was obtained. White solid. $^1H$ NMR (400 MHz, $CDCl_3$) 7.46 (t, J=8.4 Hz, 4H), 7.33 (t, J=7.6 Hz, 2H), 7.22 (t, J=7.3 Hz, 1H), 6.90 (d, J=8.7 Hz, 2H), 3.76 (s, 3H). Its spectroscopic data is consistent with the literature report.

General procedure for LLE-based reaction work-up. After the reaction was quenched with a suitable aqueous solution, such as saturated ammonium chloride solution (5 mL for adequate volume in the separatory funnel), the reaction mixture was extracted with EtOAc (5 mL×2, total 10 mL), the combined organic phases were dried with $Na_2SO_4$, filtered and the solvent was evaporated under reduced pressure. The residue was purified by an automatic flash chromatography system.

General procedure for FastWoRX-S-based (glass powder) reaction work-up. After the reaction was quenched with a suitable aqueous solution, such as saturated ammonium chloride solution (1 mL), EtOAc (5 mL to insure solids solubility) and FastWoRX-S powder (1.0 g) was added to the reaction mixture. Then, most of the solvents were evaporated under reduced pressure. Then, the reaction mixture was filtered through a CombiFlash loading cartridge and the reactor was rinsed with 5 mL brine. The loading cartridge was flushed with vacuum for 5 minutes and then was connected to an automatic flash chromatography system for purification.

General procedure for FastWoRX-M-based (magnetic powder) reaction work-up. The procedure is exactly the same as the FastWoRX-S work-up except that a magnet was used to retrieve the loaded powder from reaction mixture instead of filtration.

General procedure for FastWoRX-SP-based (sponge) reaction work-up. The procedure is exactly the same as the FastWoRX-S work-up except that a tweezer was used to retrieve the loaded sponge from the reaction mixture and to insert it into a loading cartridge.

High Recovery Rate

Figure 6:
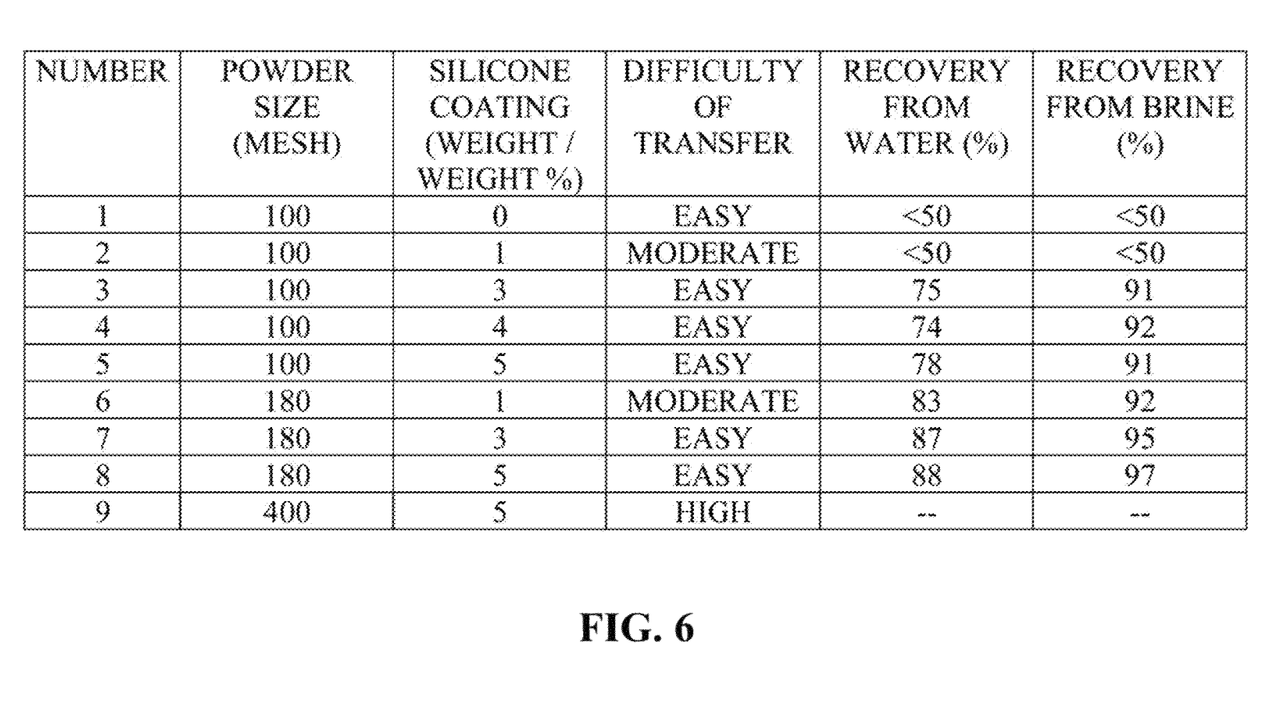
FIG. 6 is a tabular comparison of sorbent parameters on recovery rate.

The ideal reaction work-up protocol has a high recovery rate (recovery of organic products from a quenched aqueous mixture). The recovery rate for FastWoRX-based work-up will depend on two factors: 1) the complete transfer of sorbent from the reaction flask to the filtration device; 2) the water solubility of the target products. In the model system (FIG. 6), a test compound (p-toluenesulfonamide) was dissolved in an organic solvent (ethyl acetate) and pure water or a saturated solution of NaCl was added under stirring to simulate the quenching of a chemical reaction. The effect of the particle size of the glass powder and the amount of silicone coating on the recovery rate was investigated. It was found that non-coated glass powder is not effective, the optimum particle size is about 180 mesh, and the optimum amount of coating is about 5 wt/wt % of the support weight (FIG. 6, entry 8). When the particles are too small (e.g. 400 mesh), those particles tend to stick to the glass wall of reaction flask, making complete transfer to a filtration device more difficult (FIG. 6, entry 9). Because p-toluenesulfonamide has moderate water solubility (0.32 g/100 mL water), the recovery rate from pure water is only 88%. The recovery can be greatly improved (to 97%) by using brine instead of water (FIG. 6, entry 8).

Figure 7:
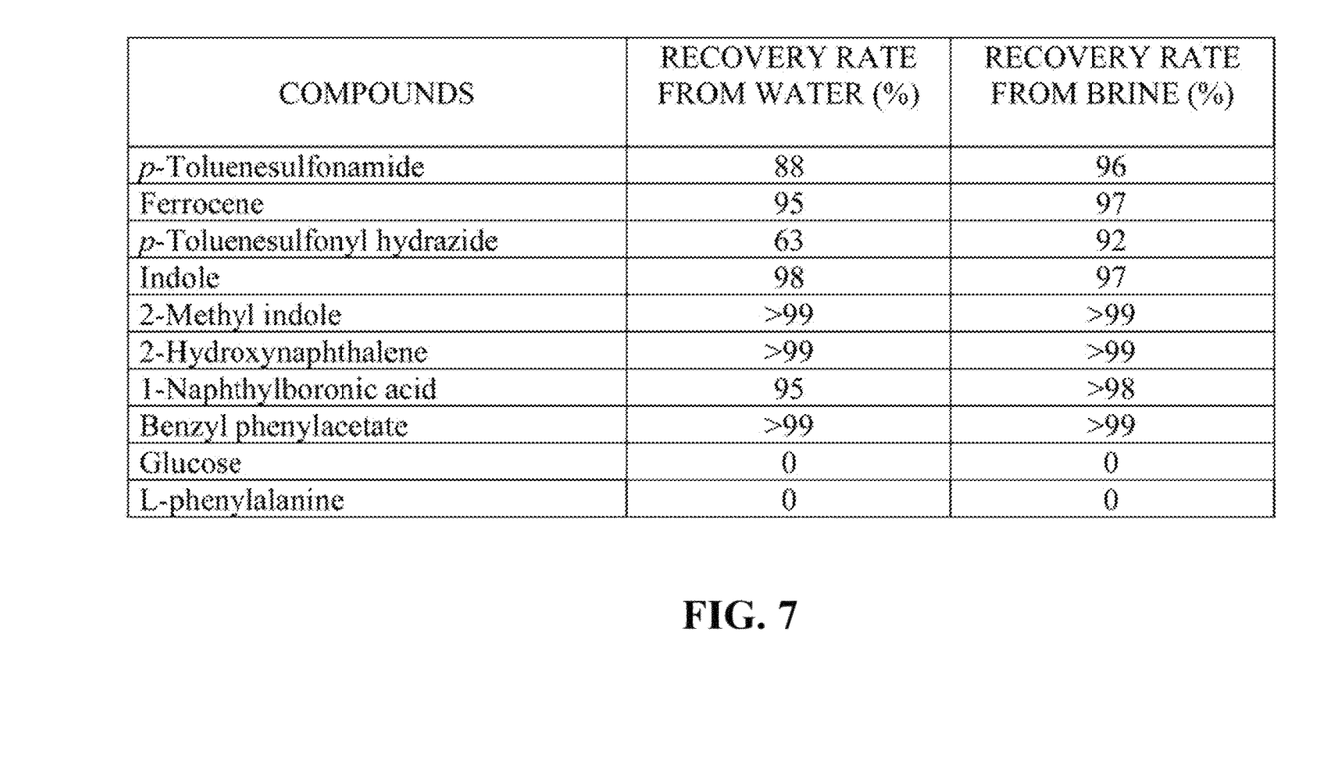
FIG. 7 is a tabular comparison of recovery rates of test compounds.

With our optimized parameters, the FastWoRX particles loaded with organic products are relatively non-adherent to the glass walls of the reaction vessel and the transfer of the sorbent from the reaction flask to the filtration device is relatively complete by rinsing with a small amount of water or brine. Consequently, the recovery rate is mostly determined by the water solubility of the target products. Recovery rates of diverse organic products were studied with various water solubilities (FIG. 7). The protocol is widely-applicable and gave excellent recoveries for most test compounds investigated (including hydrocarbon, alcohol, heterocycle, acid and ester functionalities) (FIG. 7). The only exception was the extraction of glucose and an amino acid, but this was expected because these compounds are soluble in water and not soluble in most organic solvents.

Figure 8A:
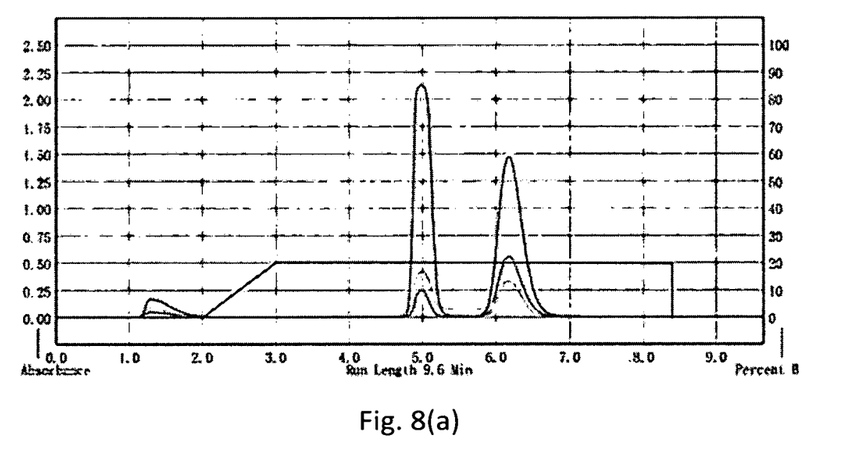
Figure 8B:
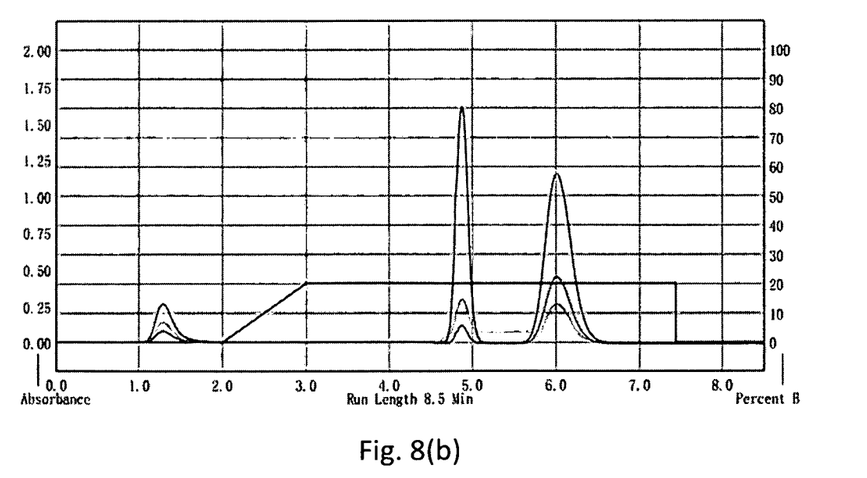

After filtration, FastWoRX powder loaded with organic products can serve as a convenient input for flash chromatographic separations. The quality of the separation achieved with the new work-up method (e.g. peak width) is similar to the conventional method of dry loading on silica gel (FIG. 8) with a test mixture of 1:1:1 of ferrocene, p-Cl-benzaldehyde and p-NO$_2$-benzaldehyde. FIG. 8 shows chromatographic traces for the separation of the test mixture a) traditional dry loading using silica and b) dry loading using FastWoRX.

Comparison Study of LLE-Based and FastWoRX-Based Reaction Work-Ups with Reference to the Reactions Shown in FIG. 9

FIG. 9, reaction (a) shows a reaction which had a yield of 98% with LLE-based work-up and 99% with FastWoRX-based work-up.—Under argon protection, two parallel dry Schlenk tubes were each charged with phenylboronic acid (2) (122 mg, 1 mmol), Pd(OAc)$_2$ (1.2 mg, 0.01 mmol, 1%), XPhos (4.8 mg, 0.02 mmol, 2%), and K$_3$PO$_4$ (212 mg, 1 mmol). Then, toluene (2 mL) and 4-bromoanisole (1) (93.5 mg, 0.5 mmol) were introduced. The resulting mixture was stirred at 80° C. for 12 hours. Both reactions were quenched with saturated ammonium chloride solution. The reaction mixtures were worked-up and purified according to the general methods. Eluent: (EtOAc:hexanes=1:50). LLE method (90.0 mg, 98%), FastWoRX method (91.3 mg, 99%).

Figure 9A:
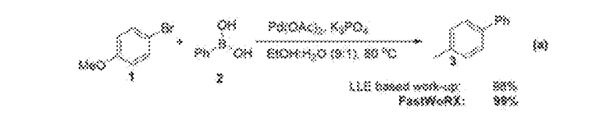

4-Methyl-1,1'-biphenyl (3). White solid. $^1$H NMR (400 MHz, CDCl$_3$) δ 7.46 (t, J=8.4 Hz, 4H), 7.33 (t, J=7.6 Hz, 2H), 7.22 (t, J=7.3 Hz, 1H), 6.90 (d, J=8.7 Hz, 2H), 3.76 (s, 3H). Its spectroscopic data is consistent with the literature report.

FIG. 9, reaction (b) shows a reaction which had a yield of 89% with LLE-based work-up and 96% with FastWoRX-based work-up.—Under argon protection, two parallel dry Schlenk tubes were each charged with 1-naphthylboronic acid (138 mg, 0.54 mmol), Pd(OAc)$_2$ (2 mg, 0.15 mol %), and K$_3$PO$_4$ (170 mg, 0.8 mmol). Then, a solvent mixture of EtOH/H$_2$O (9:1) (2 mL) and 4-bromoanisole (100 mg, 0.8 mmol) were introduced. The mixtures were stirred at 80° C. for 24 hours. Both reactions were quenched with a saturated ammonium chloride solution. The reaction mixtures were worked-up and purified according to the general methods. Eluent: (EtOAc:hexanes=1:50). LLE method (111.7 mg, 89%), FastWoRX method (120.9 mg, 96%).

Figure 9B:
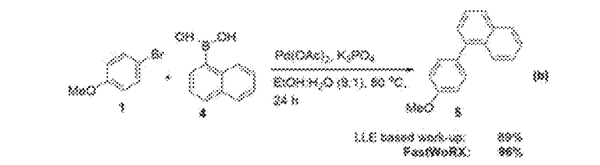

1-(4-Methoxyphenyl)naphthalene (5). Pale orange solid. $^1$H NMR (400 MHz, CDCl$_3$) δ 7.91 (t, J=9.3 Hz, 2H), 7.84 (d, J=8.2 Hz, 1H), 7.45-7.48 (m, 6H), 7.07-7.01 (m, 2H), 3.90 (s, 3H). Its spectroscopic data is consistent with the literature report.

FIG. 9, reaction (c) shows a reaction which had a yield of 89% with LLE-based work-up and 96% with FastWoRX-based work-up.—Under argon protection, two parallel dry Schlenk tubes were each charged with Pd$_2$dba$_3$ (4.6 mg, 1 mol %), XPhos (9.5 mg, 4 mol %), and NaOt-Bu (72.1 mg, 0.75 mmol). Then, t-BuOH (2 mL), aniline (55.9 mg, 0.6 mmol) and 4-bromotoluene (85.5 mg, 0.5 mmol) were introduced. The resulting mixture was stirred at 95° C. for 2 hours. Both reactions were quenched with a saturated ammonium chloride solution. The reaction mixtures were worked-up and purified according to the general methods. Eluent: (EtOAc:hexanes=1:20). LLE method (90.7 mg, 99%), Fast-WoRX method (91.1 mg, 99%).

Figure 9C:
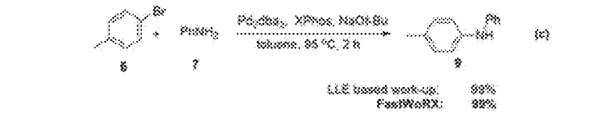
Figure 9D:
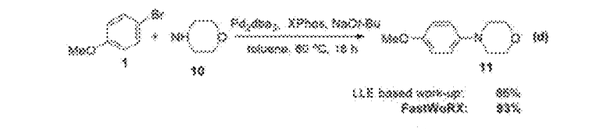
Figure 9E:
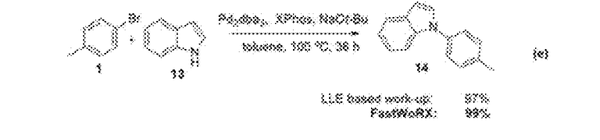

4-Methyl-N-phenylaniline (9). Orange solid. $^1$H NMR (400 MHz, CDCl$_3$) δ 7.21 (t, J=7.8 Hz, 2H), 7.06 (d, J=8.2 Hz, 2H), 6.97 (dd, J=8.2, 2.5 Hz, 4H), 6.85 (t, J=7.3 Hz, 1H), 5.53 (s, 1H), 2.28 (s, 3H). Its spectroscopic data is consistent with the literature report.

FIG. 9, reaction (d) shows a reaction which had a yield of 86% with LLE-based work-up and 93% with FastWoRX-based work-up.—Under argon protection, two parallel dry Schlenk tubes were each charged with Pd$_2$dba$_3$ (4.6 mg, 1% mmol), XPhos (9.5 mg, 4 mol %), and NaOt-Bu (72.1 mg, 0.75 mmol). Then using toluene (2 mL) as a solvent, morpholine (52.3 mg, 0.6 mmol) and 4-bromoanisole (93.5 mg, 0.5 mmol) were added. The resulting mixture was stirred at 80° C. for 16 hours. Both reactions were quenched with a saturated ammonium chloride solution. The reaction mixtures were worked-up and purified according to the general methods. Eluent: (EtOAc:hexanes=1:20). LLE method (83.4 mg, 86%), FastWoRX method (89.4 mg, 93%). 4-(4-Methoxyphenyl)morpholine (11). Orange oil. $^1$H NMR (400 MHz, CDCl$_3$) δ 7.01-6.71 (m, 4H), 3.88-3.83 (m, 4H), 3.77 (s, 3H), 3.16-2.92 (m, 4H). Its spectroscopic data is consistent with the literature report.

FIG. 9, reaction (e) shows a reaction which had a yield of 98% with LLE-based work-up and 99% with FastWoRX-based work-up.—Under argon protection, two parallel dry Schlenk tubes were each charged with indole (70.1 mg, 0.6 mmmol), Pd$_2$dba$_3$ (5.6 mg, 1.2 mol %), XPhos (18 mg, 7.5 mol %), and NaOt-Bu (67 mg, 0.7 mmol). Then, toluene (2 mL) and 4-bromotoluene (85.7 mg, 0.5 mmol) were introduced. The resulting mixture was stirred at 100° C. for 36 hours. Both reactions were quenched with a saturated ammonium chloride solution. The reaction mixtures were worked-up and purified according to the general methods. Eluent: (EtOAc:hexanes=1:10). LLE method (100.2 mg, 97%), FastWoRX method (102.6 mg, 99%). 1-(p-Tolyl)-1H-indole (14). Colorless oil. $^1$H NMR (400 MHz, CDCl$_3$) δ 7.68 (d, J=7.7 Hz, 1H), 7.52 (d, J=8.1 Hz, 1H), 7.37 (d, J=8.3 Hz, 2H), 7.33-7.24 (m, 3H), 7.23-7.11 (m, 2H), 6.66 (d, J=3.1 Hz, 1H), 2.40 (d, J=14.0 Hz, 3H). Its spectroscopic data is consistent with the literature report.

FIG. 9, reaction (f) shows a reaction which had a yield of 55% with LLE-based work-up and 57% with FastWoRX-based work-up.—Under argon protection, two parallel dry Schlenk tubes were each charged with bis(pinacolato)diboron (190 mg, 0.75 mmmol), nano-copper (6.4 mg, 0.1 mmol), and MeONa (5.4 mg, 0.1 mmol). Then, EtOH (2 mL) and phenylacetylene (51 mg, 0.5 mmol) were introduced. The resulting mixture was stirred at rt for 12 hours. Both reactions were quenched with a saturated ammonium chloride solution. The reaction mixtures were worked-up and purified according to the general methods. Eluent: (EtOAc:hexanes=1:50). LLE method (63.4 mg, 55%), Fast-WoRX method (65.7 mg, 57%).

Figure 9F:
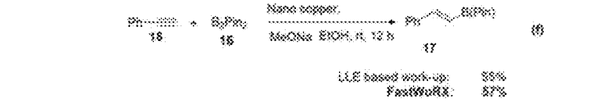

(E)-4,4,5,5-tetramethyl-2-styryl-1,3,2-dioxaborolane (17). Colorless oil. $^1$H NMR (400 MHz, CDCl$_3$) δ 7.53 (d, J=7.1 Hz, 2H), 7.45 (d, J=18.4 Hz, 1H), 7.34 (dd, J=13.8, 7.3 Hz, 3H), 6.22 (d, J=18.4 Hz, 1H), 1.34 (s, 12H). Its spectroscopic data is consistent with the literature report.

FIG. 9, reaction (g) shows a reaction which had a yield of 94% with LLE-based work-up and 97% with FastWoRX-based work-up.—Under argon protection, two parallel dry Schlenk tubes were each charged with methyl 4-iodobenzoate (131 mg, 0.5 mmol), PdCl$_2$(PPh$_3$)2 (7 mg, 2 mol %), and CuI (3.8 mg, 4 mol %). Then, THF (2 mL), triethylamine (75.9 mg, 0.75 mmol), and phenylacetylene (56.2 mg, 0.55 mmol) were introduced. The resulting mixture was stirred at 45° C. overnight. Both reactions were quenched with a saturated ammonium chloride solution. The reaction mixtures were worked-up and purified according to the general methods. Eluent: EtOAc:hexanes=1:20. LLE method (110.8 mg, 94%), FastWoRX method (114.6 mg, 97%).

Figure 9G:
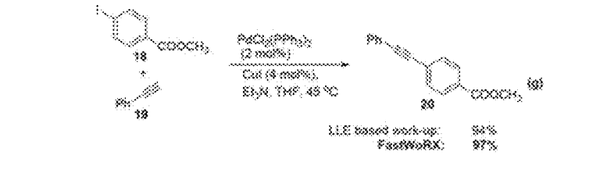

Methyl 4-(phenylethynyl)benzoate (20). Yellow solid. $^1$H NMR (400 MHz, CDCl$_3$) δ 8.02 (d, J=8.3 Hz, 2H), 7.59 (d, J=8.3 Hz, 2H), 7.57-7.52 (m, 2H), 7.41-7.33 (m, 3H), 3.92 (s, 3H). Its spectroscopic data is consistent with the literature report.

FIG. 9, reaction (h) shows a reaction which had a yield of 90% with LLE-based work-up and 92% with FastWoRX-based work-up.—Under argon protection, two parallel dry Schlenk tubes were each charged with CuI (2 mg, 2 mol %) and PdCl$_2$(PPh$_3$)2 (7 mg, 2 mol %). Then, triethylamine (2 mL), iodobenzene (102 mg, 0.5 mmol), and but-3-yn-1-ol (42 mg, 0.6 mmol) were introduced. The resulting mixture was stirred at 60° C. for 3 hours. Both reactions were quenched with a saturated ammonium chloride solution. The reaction mixtures were worked-up and purified according to the general methods. Eluent: EtOAc:hexanes=1:5. LLE method (65.4 mg, 90%), FastWoRX method (67.1 mg, 92%).

Figure 9H:
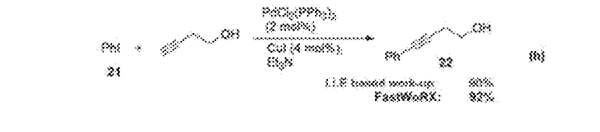

4-Phenylbut-3-yn-1-ol (22). Yellow oil. $^1$H NMR (400 MHz, CDCl$_3$) δ 7.48-7.40 (m, 2H), 7.31 (dd, J=8.7, 5.5 Hz, 3H), 3.84 (t, J=6.3 Hz, 2H), 2.71 (t, J=6.3 Hz, 2H), 2.14 (s, 1H). Its spectroscopic data is consistent with the literature report.

FIG. 9, reaction (i) shows a reaction which had a yield of 97% with LLE-based work-up and 97% with FastWoRX-based work-up.—Under argon protection, two parallel dry Schlenk tubes were each charged with CuI (2.4 mg, 2.5 mol %), PdCl$_2$(PPh$_3$)$_2$ (17.5 mg, 5 mol %). Then triethylamine (2 mL), 2-iodoaniline (125 mg, 0.5 mmol), phenylacetylene (42 mg, 0.6 mmol) were introduced. The resulting mixture was stirred at 60° C. for 3 h. Both reactions were quenched with a saturated ammonium chloride solution. The reaction mixtures were worked-up and purified according to the general methods. Eluent: EtOAc:hexanes=1:30. LLE method (93.3 mg, 97%), FastWoRX method (93.8 mg, 97%).

Figure 9I:
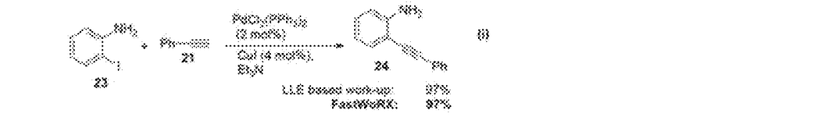

2-(Phenylethynyl)aniline (24). Yellow solid. $^1$H NMR (400 MHz, CDCl$_3$) δ 7.59-7.47 (m, 2H), 7.42-7.28 (m, 4H), 7.17-7.09 (m, 1H), 6.79-6.67 (m, 2H), 4.27 (s, 2H). Its spectroscopic data is consistent with the literature report.[13]

FIG. 9, reaction (j) shows a reaction which had a yield of 85% with LLE-based work-up and 90% with FastWoRX-based work-up.—Under argon protection, two parallel dry Schlenk tubes were each charged with CuI (2.0 mg, 2 mol %) and PdCl$_2$(PPh$_3$)2 (3.5 mg, 1 mol %). Then, triethylamine (2 mL), 2-bromobenzaldehyde (92 mg, 0.5 mmol), and trimethylsilylacetylene (58.8 mg, 0.6 mmol) were introduced. The resulting mixture was stirred at 60° C. for 3 hours. Both reactions were quenched with a saturated ammonium chloride solution. The reaction mixtures were worked-up and purified according to the general methods. Eluent: EtOAc:hexanes=1:10. LLE method (85.9 mg, 85%), FastWoRX method (91.1 mg, 90%).

Figure 9J:
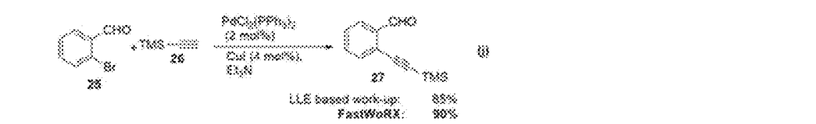

2-((Trimethylsilyl)ethynyl)benzaldehyde (27). Brown solid. $^1$H NMR (400 MHz, CDCl$_3$) δ 10.36 (t, J=4.6 Hz, 1H), 7.86-7.62 (m, 1H), 7.36 (dtd, J=9.0, 7.7, 1.3 Hz, 2H), 7.24 (td, J=7.4, 0.6 Hz, 1H), 0.15-0.04 (m, 9H). Its spectroscopic data is consistent with the literature report.

FIG. 9, reaction (k) shows a reaction which had a yield of 99% with LLE-based work-up and 99% with FastWoRX-based work-up.—Under argon protection, two parallel dry Schlenk tubes were each charged with indole (58.6 mg, 0.5 mmol) and NaH (22 mg, 0.55 mmol, 60% in mineral oil) in an ice bath. Then, DMF (1 mL) was introduced, the ice bath was removed, and the resulting mixture was stirred at room temperature for 30 minutes. Then, under an ice bath again, benzyl bromide (94 mg, 0.55 mmol) was slowly introduced. The resulting mixture was stirred overnight at room temperature. Both reactions were quenched with a saturated ammonium chloride solution. The reaction mixtures were worked-up and purified according to the general methods. Eluent: EtOAc:hexanes=1:50. LLE method (102.9 mg, 99%), FastWoRX method (102.7 mg, 99%).

Figure 9K:
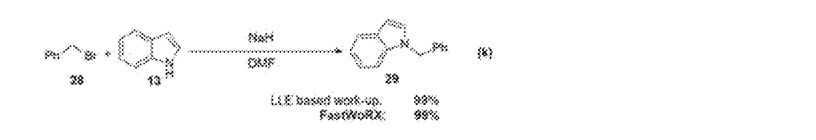

1-Benzyl-1H-indole (29). Colorless oil. $^1$H NMR (400 MHz, CDCl$_3$) δ 7.63 (d, J=7.6 Hz, 1H), 7.27-6.99 (m, 9H), 6.52 (d, J=3.1 Hz, 1H), 5.19 (s, 2H). Its spectroscopic data is consistent with the literature report.

FIG. 9, reaction (l) shows a reaction which had a yield of 93% with LLE-based work-up and 95% with FastWoRX-based work-up.—Under argon protection, two parallel dry Schlenk tubes were each charged with cyclopropylamine (143 mg, 2.5 mmol). Then, triethylamine (0.5 mL), acetonitrile (1.5 mL) and 2-fluoro-nitrobenzene (141 mg, 1 mmol) were introduced. The resulting mixture was stirred overnight at 110° C. Both reactions were quenched with a saturated ammonium chloride solution. The reaction mixtures were worked-up and purified according to the general methods. LLE method (165.2 mg, 93%), FastWoRX method (169.3, mg, 95%).

Figure 9L:
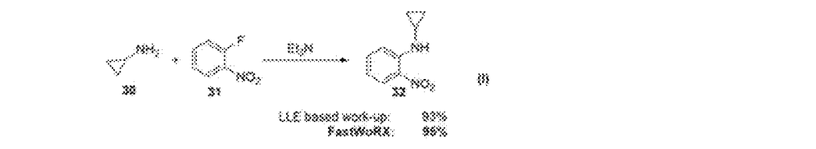

N-cyclopropyl-2-nitroaniline (32). Yellow oil. $^1$H NMR (400 MHz, CDCl$_3$) δ 8.28-7.94 (m, 2H), 7.57-7.39 (m, 1H), 7.31 (dt, J=8.0, 4.0 Hz, 1H), 6.69 (ddd, J=8.3, 7.0, 1.1 Hz, 1H), 2.65-2.51 (m, 1H), 0.95-0.88 (m, 2H), 0.69-0.61 (m, 2H). Its spectroscopic data is consistent with the literature report.

FIG. 9, reaction (m) shows a reaction which had a yield of 89% with LLE-based work-up and 90% with FastWoRX-based work-up.—Under argon protection, two parallel dry Schlenk tubes were each charged with tosylchloride (115 mg, 0.6 mmol) and amine 30 (96.5 mg, 0.5 mmol). Then, DCM (2 mL) and pyridine (79 mg, 1 mmol) were introduced. The resulting mixture was stirred overnight at 30° C. Both reactions were quenched with a saturated ammonium chloride solution. The reaction mixtures were worked-up and purified according to the general methods. Eluent: EtOAc:hexanes=1:10. LLE method (154.2 mg, 89%), FastWoRX method (156.7 mg, 90%).

Figure 9M:
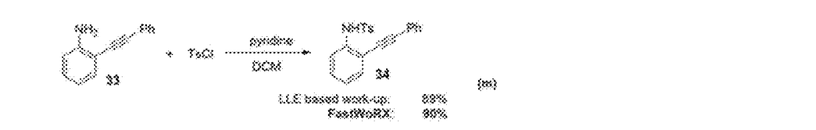

4-Methyl-N-(2-(phenylethynyl)phenyl)benzenesulfonamide (34). Colorless solid. $^1$H NMR (400 MHz, CDCl$_3$) δ 7.65 (dd, J=18.7, 8.2 Hz, 3H), 7.47 (dd, J=6.7, 3.1 Hz, 2H), 7.43-7.33 (m, 4H), 7.32-7.26 (m, 1H), 7.23-7.14 (m, 3H), 7.06 (td, J=7.6, 1.0 Hz, 1H), 2.34 (s, 3H). Its spectroscopic data is consistent with the literature report.

FIG. 9, reaction (n) shows a reaction which had a yield of 89% with LLE-based work-up and 90% with FastWoRX-based work-up.—Under argon protection, two parallel dry Schlenk tubes were each charged with LiAlH$_4$ (33.5 mg, 0.88 mmol) in an ice bath. After addition of THF (2 mL), methyl diphenylacetate (93.5 mg, 0.44 mmol) was introduced dropwise. The resulting mixture was stirred at room temperature overnight. Both reactions were quenched with a saturated ammonium chloride solution. The reaction mixtures were worked-up and purified according to the general methods. Eluent: EtOAc:hexanes=1:20. LLE method (77.3 mg, 89%), FastWoRX method (78.4 mg, 90%).

Figure 9N:
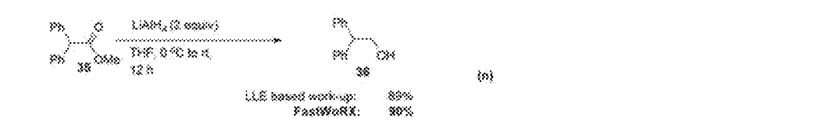

2,2-Diphenylethan-1-ol (36). White solid. $^1$H NMR (400 MHz, CDCl$_3$) δ 7.32-7.13 (m, 10H), 4.17-4.10 (m, 1H), 4.06 (d, J=7.0 Hz, 2H). Its spectroscopic data is consistent with the literature report.

FIG. 9, reaction (o) shows a reaction which had a yield of 63% with LLE-based work-up and 67% with FastWoRX-based work-up.—Under argon protection, two parallel dry Schlenk tubes were each charged with NaH (20 mg, 0.5 mmol, 60% in mineral oil) in an ice bath. Then, DMF (1 mL) was added as the solvent and 3-phenyl-2-propyn-1-ol (66.1 mg, 0.5 mmol) was introduced slowly. The resulting mixture was stirred for 30 minutes and 3,3-dimethylallyl bromide (68.6 mg, 0.46 mmol) was introduced slowly at room temperature. After the addition, the reaction mixture was stirred for 2 hours. Both reactions were quenched with a saturated ammonium chloride solution. The reaction mixtures were worked-up and purified according to the general methods. Eluent: EtOAc:hexanes=1:50. LLE method (58.2 mg, 63%), FastWoRX method (61.3 mg, 67%).

Figure 9O:
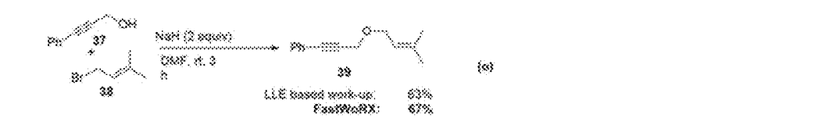

(3-((3-Methylbut-2-en-1-yl)oxy)prop-1-yn-1-yl)benzene (39). Yellow oil. $^1$H NMR (400 MHz, CDCl$_3$) δ 7.36 (dd, J=6.5, 2.9 Hz, 2H), 7.25-7.16 (m, 3H), 5.30 (t, J=7.0 Hz, 1H), 4.26 (s, 2H), 4.04 (d, J=7.1 Hz, 2H), 1.66 (d, J=17.1 Hz, 6H). Its spectroscopic data is consistent with the literature report.

FIG. 9, reaction (p) shows a reaction which had a yield of 48% with LLE-based work-up and 54% with FastWoRX-based work-up.—Under argon protection, two parallel dry Schlenk tubes were each charged with Pd(OAc)$_2$ (2.3 mg, 2 mol %), SPhos (9.5 mg, 4 mol %), and K$_3$PO$_4$ (212 mg, 1 mmol). Then, toluene (2 mL), 4-bromotoluene (85.7 mg, 0.5 mmol), and diethyl malonate (96.1 mg, 0.6 mmol) were introduced. The resulting mixture was stirred at 100° C. for 40 hours. Both reactions were quenched with a saturated ammonium chloride solution. The reaction mixtures were worked-up and purified according to the general methods. Eluent: EtOAc:hexanes=1:10. LLE method (60.4 mg, 48%), FastWoRX method (67.4 mg, 54%).

Figure 9P:
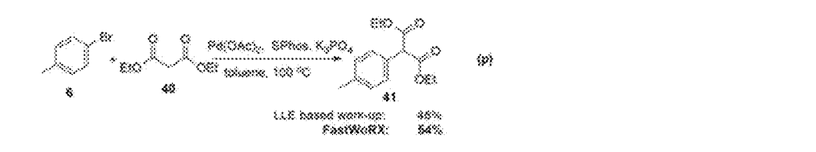

Diethyl 2-(p-tolyl)malonate (41). Colorless oil. $^1$H NMR (400 MHz, CDCl$_3$) δ 7.29 (d, J=8.1 Hz, 2H), 7.17 (d, J=8.0 Hz, 2H), 4.57 (s, 1H), 4.32-4.08 (m, 4H), 2.34 (s, 3H), 1.26 (t, J=7.1 Hz, 6H). Its spectroscopic data is consistent with the literature report.

In summary, the enhanced reaction work-ups demonstrated by the invention are disclosed in FIG. 9, which compares conventional LLE-based reaction work-ups with this invention's FastWoRX-based reaction work-ups for a broad range of reaction types. Compared to traditional LLE-based reaction work-up, the FastWoRX procedure gave comparable or better isolated yields (after chromatographic purification). In the case of reaction (p), the yield was approximately 12% higher using FastWoRX. The methods and improved embodiments of this invention resulted in a significant improvement in the case of expensive reagents or a large-scale reaction. Additionally, the FastWoRX work-up protocol only requires a simple filtration for each sample, saving significant time (see the discussion of FIG. 12). Simple filtrations can be set up in parallel using a commercially-available filtration station, further increasing the advantage of the invention. Another important benefit is that human contact with potentially toxic materials, such as solvents, was minimized and the amount of glassware (e.g. separatory funnels) to be washed was greatly reduced.

Figure 10:
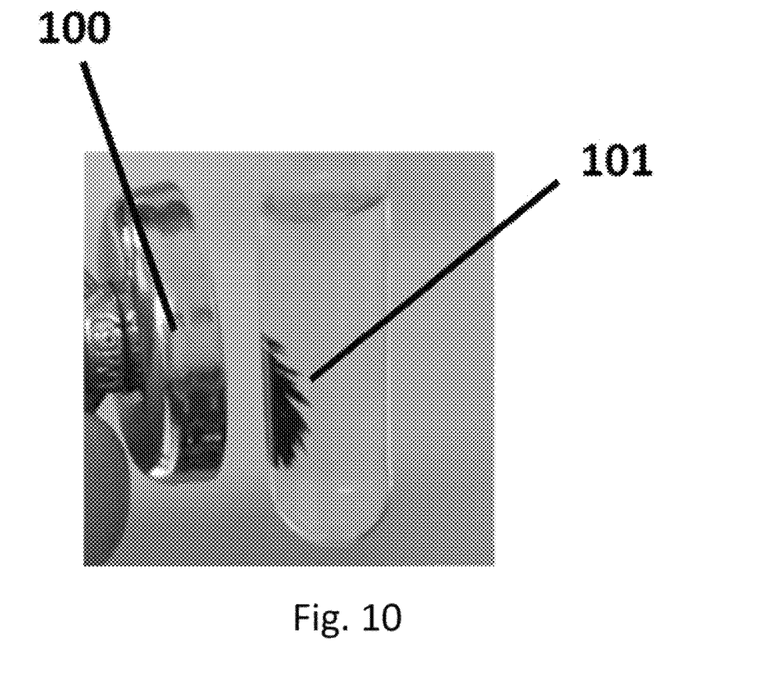
FIG. 10 is a schematic of a magnet separating the coated substrate of iron oxide particles of the invention.

In addition to glass powders, the invention may similarly coat other inorganic and organic supports. More specifically, glass powders are replaced with magnetic powders such as Fe$_3$O$_4$ powders. The coated Fe$_3$O$_4$ powders are used similarly in organic-aqueous separations and reaction work-ups. As shown in FIG. 10, the major advantage of Fe$_3$O$_4$-based powders over glass powders is that they can be retrieved and manipulated (101) by a magnetic device (100), so the filtration step can be avoided altogether. A time-varying magnetic field will result in motion of the particles, causing both agitation and enhanced mass transfer.

Figure 11:
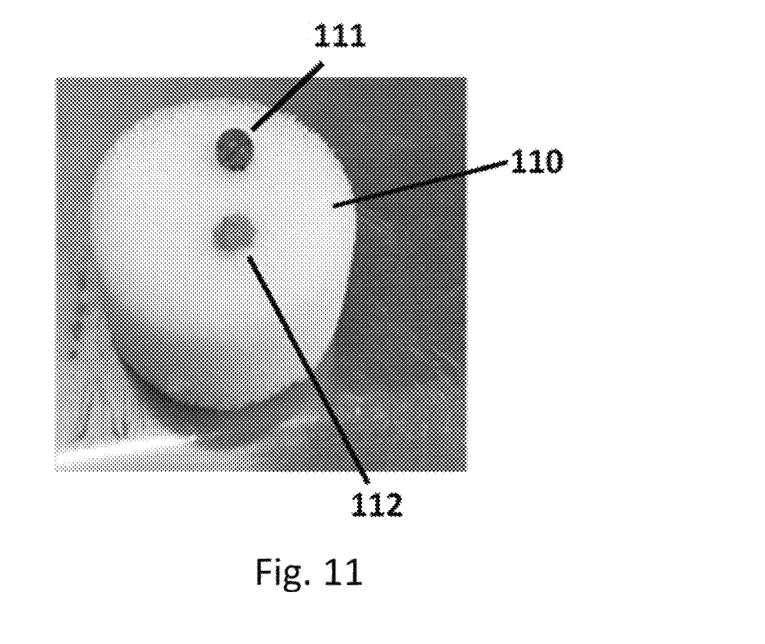
FIG. 11 is an illustration of the invention's foam discriminating between the aqueous and organic phases.

Alternatively, the glass powders may be replaced by coating synthetic sponges (e.g., polyurethane, melamine), foams (e.g., polyurethane, melamine), and other porous supports (e.g., glass frit, porous metal) with silicone elastomers or uncoated foams made from silicone. An example is shown in FIG. 11. The obtained form (110) is a water-repellent (111) and organic-absorbing (112) composite material. In a typical organic-aqueous phase separation or reaction workup, it selectively absorbs organic products but not water. Also, because it is mechanically flexible, after absorbing the organic products, it can be directly and tightly inserted into a loading cartridge or other device for chromatography or other processing without a filtration step.

In the above investigations, a one-component, condensation-cure silicone elastomer was used. Other silicone elastomer systems, such as two-part and heat-cured can also be used. For example, a two-part, platinum-catalyzed heat-cured system was tested. (The key curing reaction is an "addition reaction" of silicone hydride and a vinyl group in the presence of a platinum catalyst. In this reaction, an ethyl group [CH2-CH2] is formed and there are no by-products released during curing.) In some cases, this type of silicone elastomer has better performance.

Figure 12:
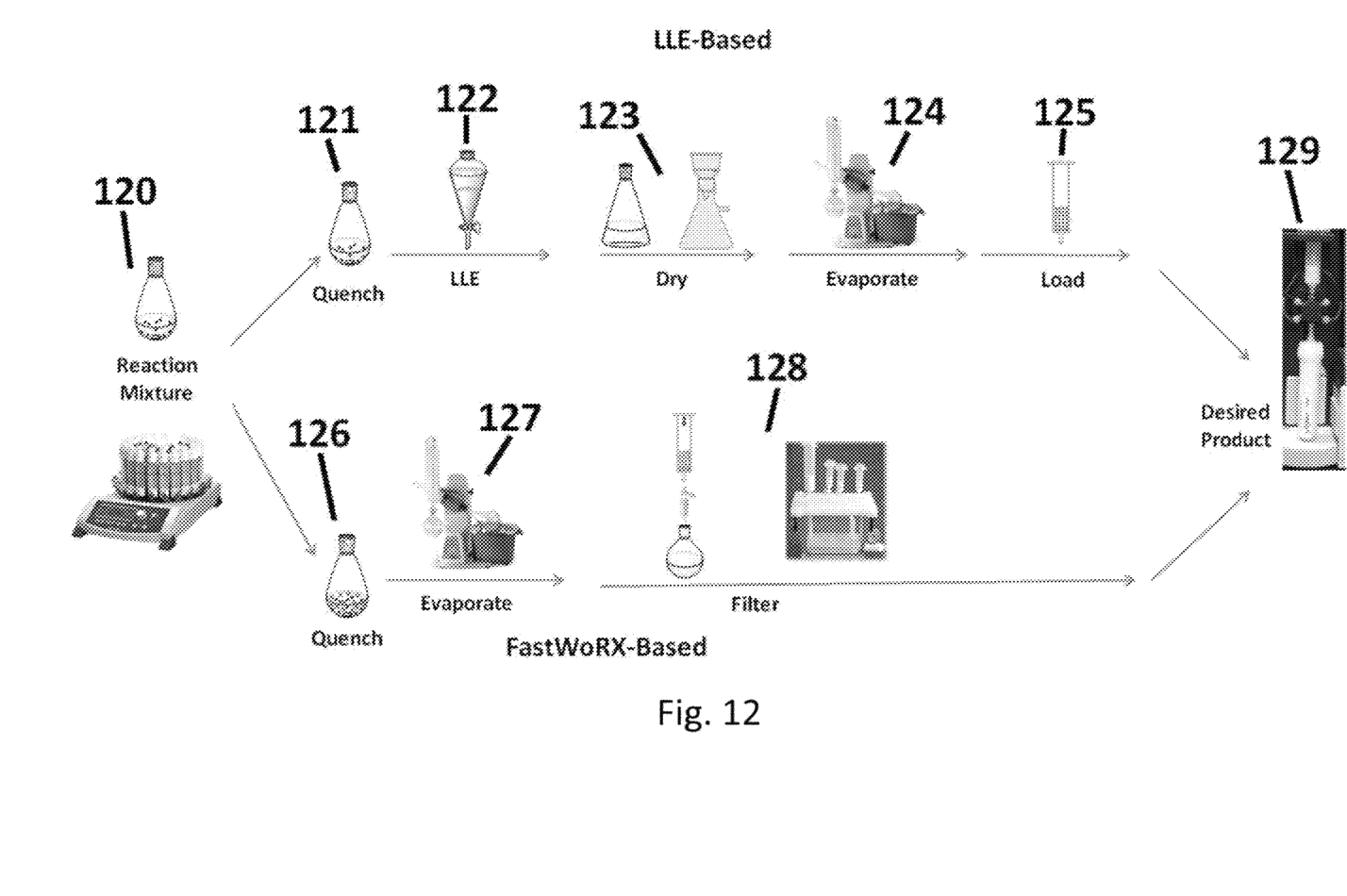
FIG. 12 is a schematic comparison of work flow for a reaction work-up with an LLE-based procedure and a Fast-WoRX-based procedure.

FIG. 12 compares the typical work flows for a traditional LLE-based reaction work-up and the invention's FastWoRX-based work-up. There may be either single or multiple reaction mixtures (120) to work-up.

In the LLE-based work-up, the reaction is quenched (121) as previously described. LLE (122) is performed enough times to separate essentially all the organics from the aqueous phase. Emulsiuon formation is possible at this step (chemistry-dependent), which will complicate and lengthen the work-up. The LLE solvent with extracted organics is dried and filtered to remove the drying agent (123). Excess solvent is evaporated under vacuum, typically in a rotovap apparatus (124). The remaining organic residue (the desired products) is either loaded into a loading cartridge (125) for chromatography or sent on for other processing to obtain the desired products (129).

In the FastWoRX-based work-up, the reaction is quenched as previously described and FastWoRX in the practioner's chosen form is added to the quenched reaction mixture (126). Excess solvent is evaporated under vacuum, typically in a rotovap apparatus (127). The FastWoRX is separated from the aqueous phase by filtration (128) in this example. A magnet or other mechanical means would be used for other forms of FastWoRX. The FastWoRX form is then washed to remove any remaining water-soluble impurities. It should be noted that because there are not two liquid phases, emulsions cannot form. The FastWoRX form containing the desired products can then go directly to chromatography or the organics may be desorbed for other processing to obtain the desired products (129).

The time to perform these steps is practitioner-dependent. The table below summarizes the inventors' best estimates based on their experience for the typical times to perform the steps (as enumerated in FIG. 12) unique to each procedure for a single reaction work-up:

| LLE-Based Work-Up | | | FastWoRX-Based Work-Up | | |
|---|---|---|---|---|---|
| Step # | Step | Estimated Time (min) | Step # | Step | Estimated Time (min) |
| 122 | LLE | 10[1] | 127 | Evaporate | 10 |
| 123 | Dry | 20+ | 128 | Filter | 10 |
| 124 | Evaporate | 10 | | | |
| 125 | Load | 10 | | | |
| Total Time | | 50+ | | | 20 |

[1]per extraction. Multiple extractions may be needed. Emulsions will also add time.

Thus, it is estimated that the use of FastWoRX can save a minimum of approximately 30 min per work-up. If multiple extractions are needed and/or an emulsion forms, additional time will be needed for the LLE-based procedure. In the FastWoRX-based procedure, both steps can easily be done in parallel (evaporation by sparging can replace evaporation in a rotovap) manually or automated, enabling significantly more time savings. These capabilities would be particularly valuable when doing many work-ups, such as during a large-scale drug discovery effort.

CONCLUSION

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

The invention claimed is:

1. A material for separating an organic phase of organic compounds or dissolved organic compounds from an aqueous mixture for extraction or purification after a chemical reaction or procedure comprising:
   a core substrate material, capable of being coated with an elastomeric substance that is both hydrophobic and organophilic/oleophilic;
   an elastomeric hydrophobic and organophilic/oleophilic coating applied to said substrate, so that substantially all of said substrate is coated to form a coated substrate material for mixing with said aqueous mixture containing an organic phase of organic compounds or dissolved organic compounds,
      wherein said hydrophobic and organophilic/oleophilic coating absorbs said organic compounds from said aqueous mixture with said organic compounds being neutral, non-ionic compounds;
      and wherein said substrate with said hydrophobic and organophilic/oleophilic coating with said organic compounds having been absorbed is capable of being separated from said aqueous mixture for further chemical reaction, purification, or analytical procedure.

2. The material of claim 1, wherein said substrate is formed from beads.

3. The material of claim 1, wherein said substrate is formed from granular or crystalline powder.

4. The material of claim 1, wherein said substrate comprises iron oxide to become a coated iron oxide substrate.

5. The material of claim 1, wherein said substrate is comprised of glass.

6. The material of claim 1, wherein said substrate is comprised of ceramic material.

7. The material of claim 4, wherein said substrate is capable of being separated from said aqueous mixture by using a magnet to magnetically attach or manipulate said coated iron oxide substrate.

8. The material of claim 1, wherein said elastomeric hydrophobic and organophilic/oleophilic coating is comprised of a polysiloxane polymer.

9. The material of claim 1, wherein said elastomeric hydrophobic and organophilic/oleophilic coating is comprised of poly-dimethylsiloxane polymer.

10. A material for separating an organic phase of organic compounds or dissolved organic compounds from an aqueous mixture for extraction or purification after a chemical reaction or work-up procedure comprising:
    a core substrate material capable of being coated with an elastomeric substance that is both hydrophobic and organophilic/oleophilic;
    an elastomeric hydrophobic and organophilic/oleophilic coating applied to said substrate, so that substantially all of said substrate is coated to form a coated substrate material for mixing with said aqueous mixture containing an organic phase of organic compounds or dissolved organic compounds,
       wherein said hydrophobic and organophilic/oleophilic coating absorbs said organic compounds from said aqueous mixture with said organic compounds being neutral, non-ionic compounds;
       and wherein said substrate with said hydrophobic and organophilic/oleophilic coating with said organic compounds having been absorbed is capable of being separated from said aqueous mixture for further chemical reaction, purification, or analytic procedure.

11. The material of claim 10, wherein said substrate is formed from beads.

12. The material of claim 10, wherein said substrate is formed from granular or crystalline powder.

13. The material of claim 10, wherein said substrate comprises iron oxide.

14. The material of claim 13, wherein said substrate is capable of being separated from said aqueous mixture by using a magnet to magnetically attach or manipulate said coated iron oxide substrate.

15. The material of claim 10, wherein said substrate is comprised of glass.

16. The material of claim 10, wherein said substrate is comprised of ceramic material.

17. The material of claim 10, wherein said elastomeric hydrophobic and organophilic/oleophilic coating is comprised of a polysiloxane polymer.

18. The material of claim 10, wherein said elastomeric hydrophobic and organophilic/oleophilic coating is comprised of poly-dimethylsiloxane polymer.

* * * * *